Oct. 27, 1959 R. R. DAHL 2,910,093
SIDE WALL FLOW CONTROL
Filed May 19, 1955 2 Sheets-Sheet 1

INVENTOR.
ROBERT R DAHL
BY
ATTYS.

INVENTOR.
ROBERT R DAHL

United States Patent Office 2,910,093
Patented Oct. 27, 1959

2,910,093

SIDE WALL FLOW CONTROL

Robert R. Dahl, Chicago, Ill., assignor to The Dole Valve Company, Chicago, Ill., a corporation of Illinois Application May 19, 1955, Serial No. 509,548

1 Claim. (Cl. 138—46)

This invention relates to improvements in flow control devices for maintaining a substantially constant rate of fluid flow over a wide range of pressure variations.

A principal object of my invention is to provide a simple and improved form of resilient flow control device for controlling the flow of fluid through a passageway, so arranged as to minimize strain on the flow control device and turbulence and noise in the fluid control.

Another object of my invention is to provide an improved form of flow control device in which pressure is dissipated over a relatively long area of a passageway.

Still another object of my invention is to provide an improved form of flow control device in which strain on the flow control device and turbulence and noise is minimized by regulating the flow of fluid along the wall of a passage by an elastic member movable into engagement with the wall thereof upon increases in pressure.

A still further object of my invention is to provide a novel and improved form of resilient flow control device particularly adapted to control the flow of fluid to an outlet passageway, eccentric of the center of the inlet passageway.

A still further object of my invention is to provide a novel and improved form of resilient flow control device in which a flow control member is seated against the plane shoulder or seat of a passageway and extends along the wall of the passageway, and the control of the flow of fluid is attained by the restriction of the flow area between the flow control member and wall of the passageway as pressures on the flow control member increase.

A still further object of my invention is to provide a more efficient and simpler form of resilient flow control member particularly arranged to reduce noise generation and turbulence, in which the flow control member is seated against the flat seat or shoulder of a passageway and engages the wall of the passageway for a substantial length and controls the flow of fluid along the wall of the passageway by pressure acting along the wall of the flow control member on the opposite side thereof from the wall of the passageway.

These and other objects of my invention will appear from time to time as the following specification proceeds and with reference to the accompanying drawings wherein.

Figure 1:
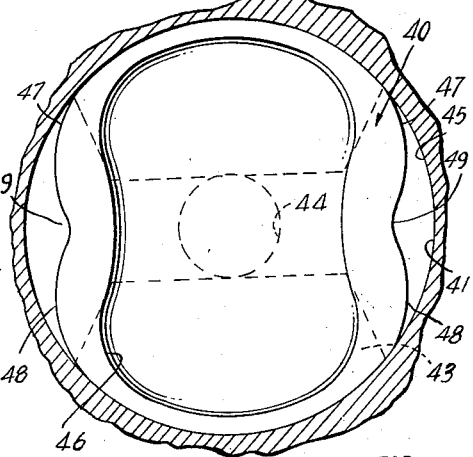
Figure 1 is a horizontal sectional view taken through a fluid flow passageway illustrating a flow control member constructed in accordance with the principles of the present invention.
Figure 2:
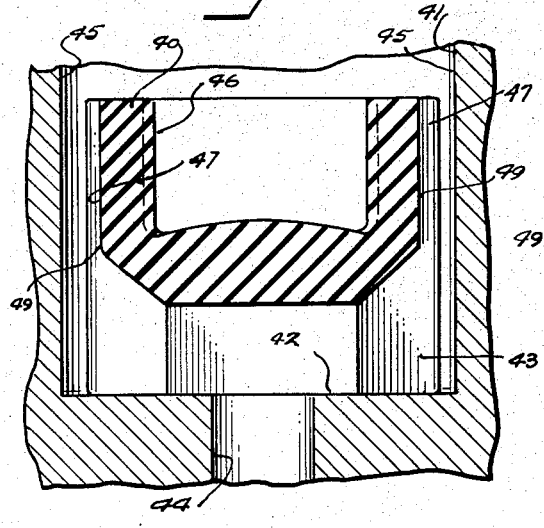
Figure 2 is a transverse sectional view taken through the flow control member illustrated in Figure 1 and showing the flow control member in a relaxed condition.
Figure 3:
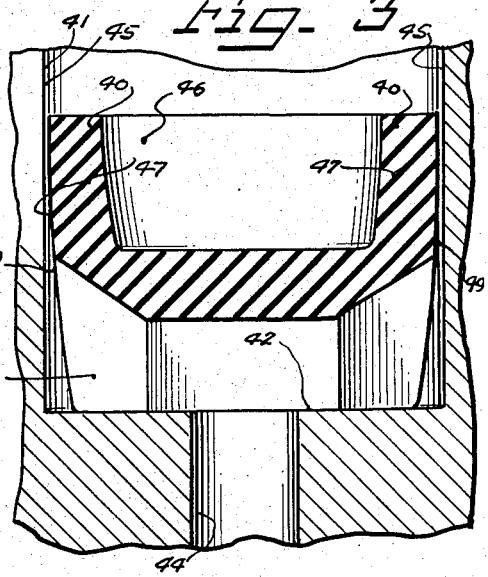
Figure 3 is a view somewhat similar to Figure 2 but showing the flow control member under pressure in a stressed condition.

In the embodiment of the invention illustrated in Figures 1, 2 and 3 there is shown a flow control structure in which the flow control is invested in a plurality of passageways and the outlet passageway is concentric with the inlet passageway, although it need not be concentric and may be eccentrically arranged if desired.

In this form of my invention I have shown a resilient flow control member 40, supported in an inlet passageway 41 on a shoulder or seat 42 on spaced feet or ribs 43, and controlling the flow through an outlet passageway 44 by varying the flow areas along a wall 45 of the inlet passageway 41, as pressures on the flow control member vary.

The flow control member 40 like the flow control members 13 and 30 may be made from a resilient or elastic material, such as rubber, an elastomer or a like material and is herein shown as being generally cup-like in form having a central cavity 46 against which fluid under pressure may act.

A major portion of the flow control member 40 is shown as having a relatively close fit with the wall 45 of the inlet 41 while opposed recessed portions 47 of the flow control member form flow passageways along the wall 45. Each recessed portion 47 has a central concave face 49 formed along an opposite curve from the curve of the wall forming the recess 47 to prevent the complete blocking off of the flow along the wall 45, as pressures on the flow control member increase to the maximum pressures flowing within the inlet 41.

Figure 5:
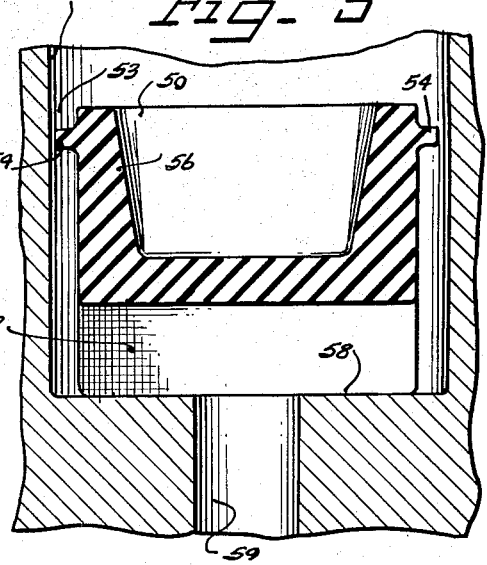
Figure 5 is a view somewhat similar to Figure 4 but showing the flow control member in a stressed flow control condition in the passageway.

As the pressures on the flow control member 40 vary, the differential in pressures acting on opposite sides of the wall portion defining the cavity 46 will force the recessed wall portion to move inwardly along the wall 45 toward the center of the concave face 49 as in the form of my invention shown in Figures 1 and 5, and provide a gradually decreasing flow area as the pressures at the inlet increase, resulting in a substantially uniform flow of fluid through the outlet 44, regardless of variations in pressure at the inlet.

It should here be understood that the feet or ribs 43 form a relatively rigid support for the flow control member 40 and have no function in the control of the flow of fluid from the inlet through the outlet, the flow control being effected by the differential in pressure on opposite sides of the wall portion 47 defining the recess 48, as well as the pressure on the upstream face of the flow control member.

It should further be understood that while I have only shown two recessed portions or flow control passageways 47, that the number of flow control passageways may be varied to provide three or four or more passageways as desired.

Figure 8:
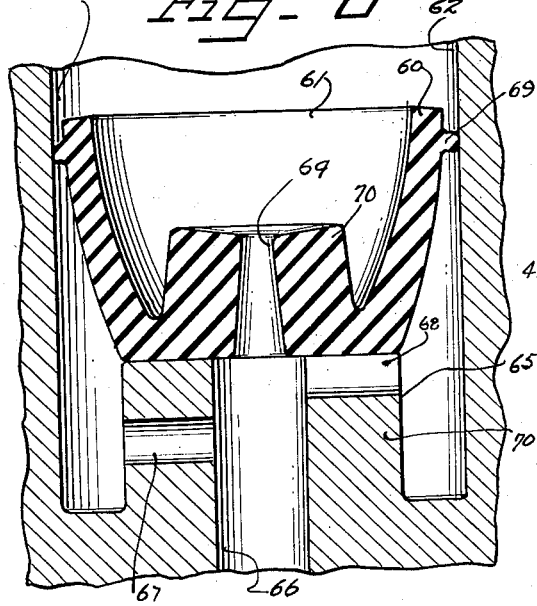
Figure 8 is a view somewhat similar to Figure 7 but showing the flow control member in a stressed condition blocking the flow of fluid along the wall of the passageway and deformed to control the flow of fluid through the central orifice leading therethrough.
Figure 4:
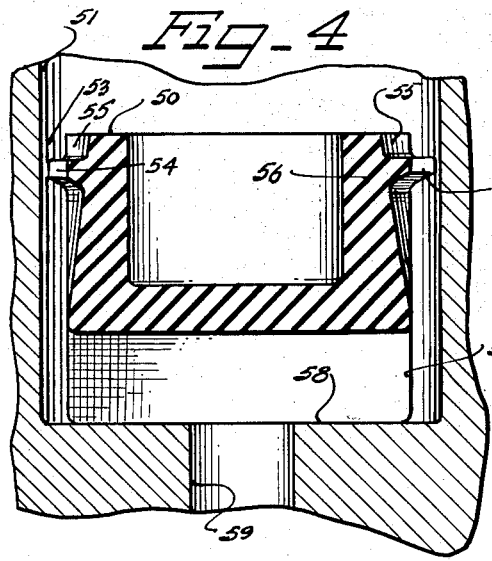
Figure 4 is a view somewhat similar to Figure 2 but showing a modified form of flow control member in which the control is invested in control lips in passageways leading along each side of the flow control member and showing the flow control member in a relaxed condition.

In Figures 4 and 5 I have shown a flow control member 50 much like the flow control member 40 shown in Figures 1, 2, and 3 except that the flow control area along the length of a wall 51 of an inlet passageway 53 has been decreased from the form of my invention illustrated in Figures 8, 9 and 10 and the flow control is invested in lips 54 projecting outwardly from recessed portions 55 of a wall 56 of the flow control member.

In this form of my invention, the flow control member is supported on spaced integral lugs or legs 57 in spaced relation with respect to a shoulder 58 on which the flow control member rests, the space between the legs 57 forming a flow passageway to a discharge outlet 59, shown as being arranged coaxially of the inlet 53.

The differential in pressure on the inside and outside of the wall portion 56, thus moves the control lips 54 from the relaxed position shown in Figure 11 toward the wall 51, as shown in Figure 12, to reduce the flow area along said wall as the pressures on the flow control member increase, and thus to provide a substantially uniform discharge volume through the outlet 59 regardless of variations in pressure in the inlet 53.

Figure 6:
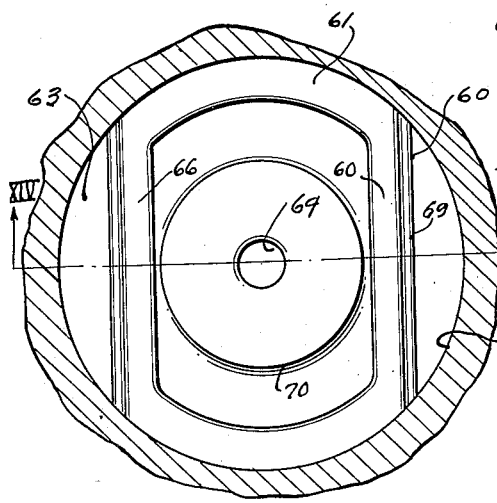
Figure 6 is a horizontal sectional view taken through a passageway showing a flow control member controlling the flow of fluid along the passageway by flexing toward the wall thereof under low pressure conditions and controlling the flow under high pressure conditions by deforming a central orifice thereof.
Figure 7:
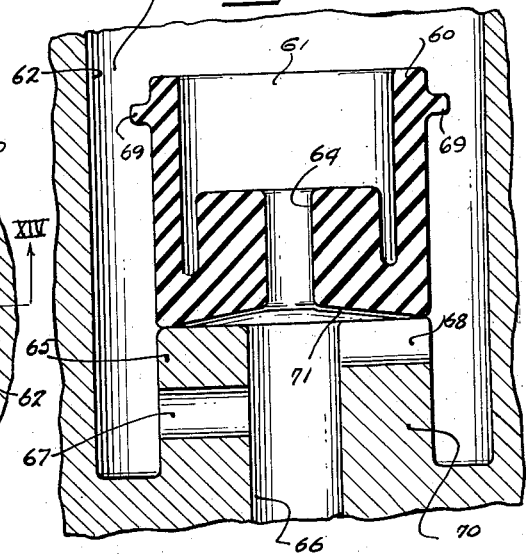
Figure 7 is a transverse sectional view taken substantially along the line XIV—XIV of Figure 6.

In the form of my invention illustrated in Figures 6, 7, and 8, I utilize deformable wall portions 60 of a flow control member 61, to control the flow of fluid along a wall 62 of an inlet passage 63 at low pressures, and utilize a deformable orifice 64 leading through the center of the flow control member for controlling the flow at higher pressures, the flow control member being in the nature of a by-pass flow control in which the flow along the wall 62 is entirely shut off upon certain high pressure conditions, and the high pressure control is solely by the restriction of the orifice 64 upon increases in pressure on the flow control member.

In this form of my invention the inlet passage 63 is shown as having a central boss 65 extending therein, having a discharge passageway 66 leading therethrough concentric with the inlet passage 63. The boss 65 is shown as having cross-passageways 67 and 68 affording communication from the inlet 63 to the outlet passageway 66.

The flow control member 61 is seated on the end of the boss 65 within the inlet passage 63 in engagement with the wall thereof, the wall portions 60 being spaced inwardly from the wall 62 and providing individual flow passageways along the wall 62 restricted by control lips 69 extending outwardly of the wall portions 60, for controlling the flow of fluid at low pressures and moving into engagement with the wall 62 under high pressure conditions, to entirely shut off the flow of fluid therealong, as shown in Figure 15.

The central orifice 64 is shown as leading through a central boss-like portion 70 of the flow control member, extending upwardly within the wall portions 60 and spaced inwardly therefrom for a greater portion of the height thereof, to provide a high degree of flexibility in the wall portions 60 and accommodate the flexing of said wall portions and the flow control lips 69 toward the wall 62 of the inlet 63 under low pressure conditions. The under face of the flow control member 61 is shown as being provided with a recessed bottom portion 71, shown as being generally frusto-conical in form.

Thus when the flow control lips 69 have closed off the flow of fluid along the wall 62, increases in pressure on the boss 70 will move the frusto-conical bottom portion 71 inwardly along the top of the boss 65, to effect a gradually decreasing flow area through the orifice 64 at the inlet end thereof, as pressures thereon increase, and to provide a substantially uniform flow through the outlet 66 regardless of variations in pressure thereon.

It will be understood that modifications and variations of the present invention may be effected without departing from the spirit and scope of the novel concepts thereof.

I claim as my invention:

In a flow control device, a casing having a flow passageway of circular cross-section leading therethrough, a seat in said passageway facing in an upstream direction, a resilient flow control member in said passageway having a base portion seated on said seat and a cup-like wall portion extending in an upstream direction from said seat, said wall portion having adjacent its upstream end a pair of diametrically opposite flow controlling portions spaced from the wall of said passageway adjacent a first pair of diametrically opposed arcs on a cross-section of said passageway, and a pair of diametrically opposite connecting portions substantially in contact with the wall of said passageway along the full length respectively of a second pair of diametrically opposite arcs completing a circle with said first pair of arcs on said circular cross-section of said passageway, said flow control portions forming radial inward continuations of said connecting portions and forming with the wall of said passageway two diametrically opposite flow restricting passages cooperating with the wall of said passageway to provide a substantially constant rate of flow through said passageway under varying upstream pressure conditions, and said flow controlling portions being freely flexible toward the wall of said passageway without substantial compression of said connecting portions.

References Cited in the file of this patent

UNITED STATES PATENTS

| | | |
|---|---|---|
| 2,632,476 | Miller | Mar. 24, 1953 |
| 2,670,010 | Kessler | Feb. 23, 1954 |
| 2,728,355 | Dahl | Dec. 27, 1955 |
| 2,781,060 | Frey | Feb. 12, 1957 |

FOREIGN PATENTS

| | | |
|---|---|---|
| 372,286 | Great Britain | May 2, 1932 |
| 1,039,283 | France | Oct. 6, 1953 |